US012754132B2

(12) United States Patent
Tuthill

(10) Patent No.: US 12,754,132 B2
(45) Date of Patent: Oct. 6, 2026

(54) OPTICAL SENSOR AND SYSTEM

(71) Applicant: The University of Sydney, Sydney (AU)

(72) Inventor: Peter Tuthill, Sydney (AU)

(73) Assignee: The University of Sydney, Sydney (AU)

( * ) Notice: Subject to any disclaimer, the term of this patent is extended or adjusted under 35 U.S.C. 154(b) by 140 days.

(21) Appl. No.: 18/862,064

(22) PCT Filed: May 4, 2023

(86) PCT No.: PCT/AU2023/050374
§ 371 (c)(1),
(2) Date: Oct. 31, 2024

(87) PCT Pub. No.: WO2023/212780
PCT Pub. Date: Nov. 9, 2023

(65) Prior Publication Data

US 2025/0180472 A1 Jun. 5, 2025

(30) Foreign Application Priority Data

May 6, 2022 (AU) ................................ 2022901208

(51) Int. Cl.
*G01N 21/3504* (2014.01)
*G02B 6/02* (2006.01)

(52) U.S. Cl.
CPC ....... *G01N 21/3504* (2013.01); *G02B 6/0208* (2013.01); *G02B 6/022* (2013.01); *G02B 6/02204* (2013.01); *G01N 2201/0616* (2013.01); *G01N 2201/0826* (2013.01)

(58) Field of Classification Search
None
See application file for complete search history.

(56) References Cited

U.S. PATENT DOCUMENTS 7,557,990 B2 * 7/2009 Blais-Ouellette .... G02B 5/1828 359/569
7,982,869 B2 * 7/2011 Ban ........................ G01N 21/65 250/281
8,702,321 B2 * 4/2014 Marple ..................... G01J 3/44 385/12
2007/0075225 A1 4/2007 Xia et al.
(Continued)

OTHER PUBLICATIONS

PCT International Search Report and Written Opinion, PCT/AU2023/050374, May 4, 2023, 9 Pages.

*Primary Examiner* — Marcus H Taningco
(74) *Attorney, Agent, or Firm* — Fenwick & West LLP

(57) ABSTRACT

An optical sensor for detecting a chemical species in a sample, the optical sensor comprising a single mode fibre having a fibre Bragg grating, wherein the fibre Bragg grating has a refractive index profile, the optical sensor arranged to provide an output optical signal based on a positive detection of the chemical species in the sample, wherein the sample, upon illumination, emits a sample optical signal having an optical frequency signature comprising a plurality of spectral lines that are associated with the chemical species, wherein the refractive index profile is associated with the optical frequency signature, and the fibre Bragg grating is arranged to be modulated to generate the output optical signal.

12 Claims, 6 Drawing Sheets

101

(56) References Cited

U.S. PATENT DOCUMENTS

| | | | | |
|---|---|---|---|---|
| 2008/0219618 | A1 | 9/2008 | McCarthy et al. | |
| 2009/0263072 | A1* | 10/2009 | Albert | G01N 21/21 385/12 |
| 2010/0008625 | A1 | 1/2010 | Buryak | |
| 2010/0014809 | A1 | 1/2010 | Edvell | |
| 2012/0092677 | A1* | 4/2012 | Suehira | A61B 3/102 356/479 |
| 2012/0103066 | A1* | 5/2012 | Xia | G01N 21/774 73/25.05 |
| 2018/0011244 | A1 | 1/2018 | Zhu et al. | |
| 2022/0221715 | A1 | 7/2022 | Rahim et al. | |

* cited by examiner

Fig. 4A
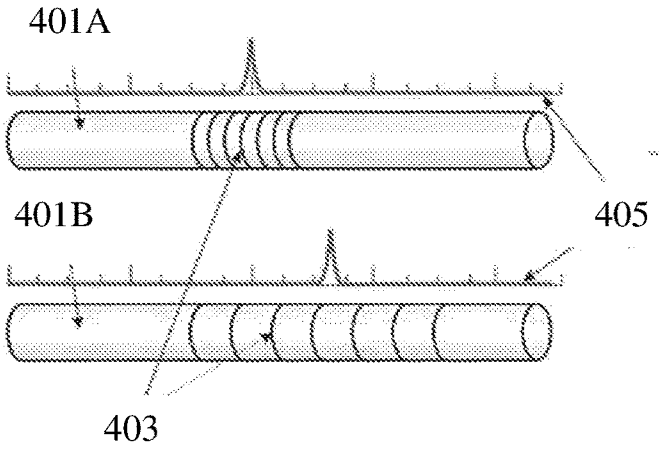
Fig. 4B
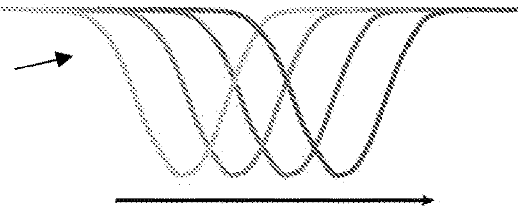
Fig. 4C
Fig. 4

OPTICAL SENSOR AND SYSTEM

TECHNICAL FIELD

The present invention relates generally to an optical sensor for detecting a chemical species in a sample, and an optical system with one or more optical sensors.

BACKGROUND

There are many instruments that work in remote sensing or laboratory settings by dispersing light received from an optical source, and recording the spectrum for subsequent analysis of chemical species in a sample. Spectrographs to accomplish this task are ubiquitous across physics and chemistry. Demands on these devices can become severe when wide spectral bands must be recovered at high spectral resolution. For example, the more recent growth of simultaneous spatio-spectral (or hyper-spectral) imaging requires a spectrum across many spatial elements comprising an image. In turn, these demands drive instrument size, complexity, data volume and cost.

SUMMARY

It is an object of the present invention to substantially overcome, or at least ameliorate, one or more disadvantages of existing arrangements.

Disclosed are arrangements which seek to address the above problems by providing an improved optical sensor that can detect a chemical species in a sample without requiring large, complex and costly equipment. Further arrangements are disclosed that provide an improved modulation process for these improved optical sensors.

According to a first aspect of the present disclosure, there is provided an optical sensor for detecting a chemical species in a sample, the optical sensor comprising a single mode fibre having a fibre Bragg grating, wherein the fibre Bragg grating has a refractive index profile, the optical sensor arranged to provide an output optical signal based on a positive detection of the chemical species in the sample, wherein the sample, upon illumination, emits a sample optical signal having an optical frequency signature comprising a plurality of spectral lines that are associated with the chemical species, wherein the refractive index profile is associated with the optical frequency signature, and the fibre Bragg grating is arranged to be modulated to generate the output optical signal.

The output optical signal may be based on a transmitted optical signal that is generated by the fibre Bragg grating by the sample optical signal entering the fibre Bragg grating at a first end and exiting the fibre Bragg grating at a second end opposite to the first end.

The output optical signal may be based on a reflected optical signal that is generated by the fibre Bragg grating by the sample optical signal entering the fibre Bragg grating at a first end, being reflected, and then exiting the fibre Bragg grating at the first end.

The optical signal may be based on a differential signal generated from a transmitted optical signal and a reflected optical signal, wherein the transmitted optical signal and the reflected optical signal are generated by the fibre Bragg grating.

The optical sensor may further comprise a modulator arranged to modulate the output optical signal generated by the fibre Bragg grating. The modulator may be arranged to frequency shift the output optical signal by manipulating the fibre Bragg grating longitudinally. The modulator may be arranged to frequency shift the output optical signal by adjusting the temperature of the fibre Bragg grating.

An optical sensor system may comprise one or more of the above optical sensors, and a detection module arranged to: analyse the output optical signal and develop a detection signal that indicates the positive detection of the chemical species based on the analysis.

The detection module may be further arranged to: develop a differential signal based on the output optical signal, wherein the output optical signal comprises a transmitted optical signal and a reflected optical signal generated by the one or more optical sensors, and develop the detection signal based on the differential signal.

The optical sensor system may comprise a modulator arranged to frequency shift the optical output signal by manipulating the fibre Bragg grating longitudinally. The modulator may be a fibre stretcher arranged to stretch the optical fibre to frequency shift the optical output signal.

The optical sensor system may further comprise a plurality of the optical sensors described above, and a plurality of micro lenses arranged in an array, wherein the micro lenses are aligned with the optical sensors for sensing over multiple sightlines.

Other aspects are also disclosed.

BRIEF DESCRIPTION OF THE DRAWINGS

At least one embodiment of the present invention will now be described with reference to the drawings and appendices, in which:

FIG. 4 shows an example of an optical sensor being used in a modulation mode and a spectral response wavelength shift according to an embodiment of the present disclosure;

DETAILED DESCRIPTION INCLUDING BEST MODE

Figure 1:
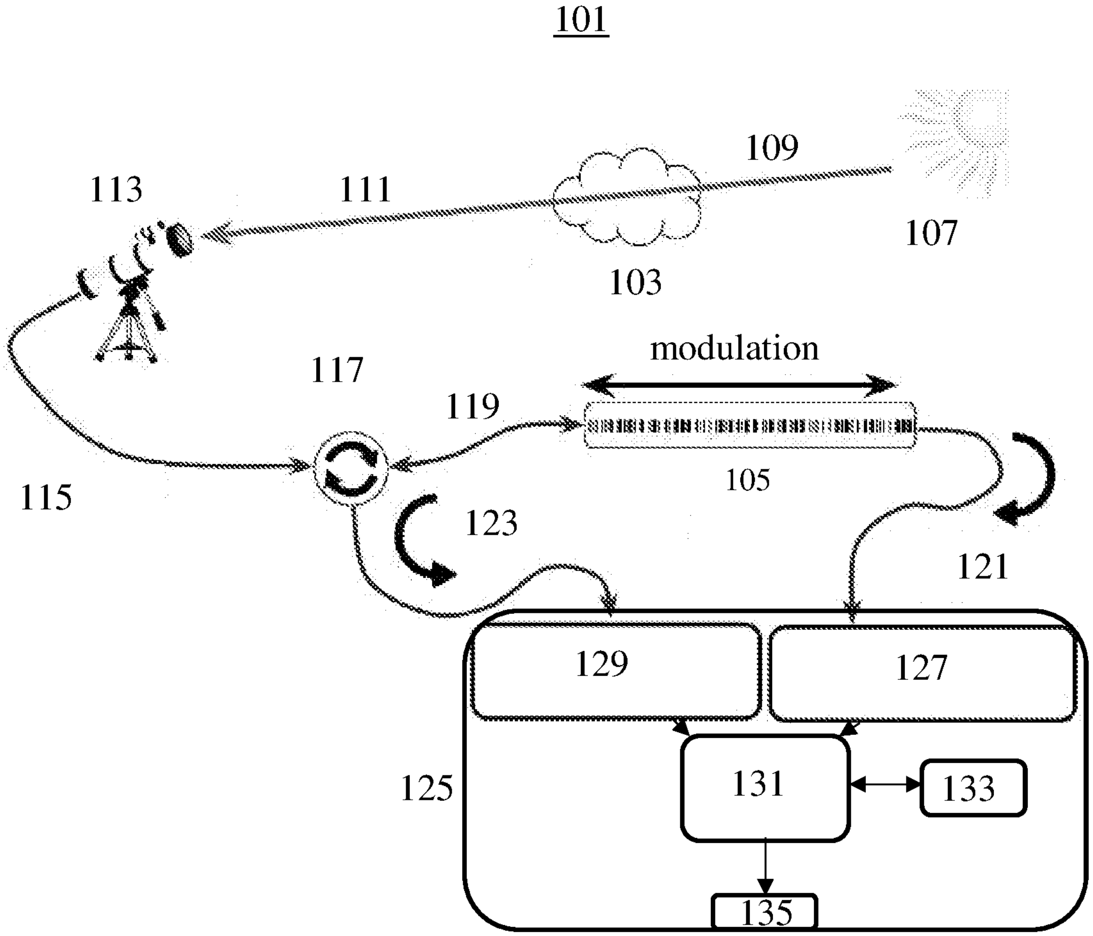
FIG. 1 shows a schematic diagram of an optical sensor system according to an embodiment of the present disclosure.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic diagram of an optical sensor system 101 according to an embodiment of the present disclosure.

According to one example, a sample 103 is present that contains a chemical species. The chemical species may be present in a sample that is a gas. An optical sensor 105 of the system 101 is arranged to detect whether the chemical species is present in the sample or not.

As an alternative, the chemical species may be in a sample that is an alternative medium, such as a liquid or solid through which an optical signal can pass.

In this example, only one optical sensor 105 is used. However, it will be understood that, as an alternative, two or more optical sensors may be used in the system.

An optical source 107 illuminates the sample 103 with a broadband spectrum optical signal 109. The optical signal 109 passes through the sample 103 and exits as a sample optical signal 111 that has an optical frequency signature that has multiple spectral lines that are associated with the chemical species. That is, the optical signal 109 is modified by the chemical species in the sample 103 to produce the sample optical signal 111.

In this example, the optical source is the sun, e.g. daylight. However, it will be understood that the optical source may be any other suitable optical source, such as a manmade optical source including a laser, light emitting diode, photodiode etc. Further, according to one example, the sample itself might be sufficiently excited to be self-luminous, emitting its own signal (such as a hot gas). That is, the sample, upon (self) illumination, emits a sample optical signal.

In this example, the sample optical signal 111 is passed through an optical lens 113. The optical lens 113 may be any suitable lens or light collector, such as a telescope for example. The optical lens 113 receives the sample optical signal 111 and injects it into an optical fibre 115 using standard known optical devices and techniques. In this example, the sample optical signal 111 is fed into an optical circulator or splitter 117 via the optical fibre 115. The splitter 117 feeds the sample optical signal 111 via a further optical fibre 119 into the optical sensor 105, which is in the form of a modulated fibre Bragg grating. The fibre Bragg grating is arranged to be modulated to generate an output optical signal. For example, the output optical signal may be a transmitted optical signal 121, a reflected optical signal 123, or a combination (e.g. differential signal) of the transmitted optical signal 121 and the reflected optical signal 123. The transmitted optical signal 121 and reflected optical signal 123 are fed into a detection system 125. The detection system 125 has a first optical detection module 127 that receives the transmitted optical signal 121. In this example, the detection system 125 also has a second optical detection module 129 that receives the reflected optical signal 123.

Each of the first and second optical detection modules (127 and 129) include photodetectors, for example, that generate a voltage signal based on the received optical signals. The first and second optical detection modules (127 and 129) communicate with one or more microprocessors 131 in the detection system 125 that are in communication with, or have therein, a memory module 133 that stores data associated with the output optical signal (i.e. the transmitted optical signal 121, the reflected optical signal 123 or a differential signal). The microprocessor 131 then generates an output, via an output interface 135, in the form of a detection signal that indicates whether the chemical species is present in the sample or not.

The detection signal may be developed by the detection system 125 by comparing the transmitted optical signal 121 and the reflected optical signal 123. For example, the presence of the chemical species in the sample may be indicated by the repeated detection of a fluctuation occurring at exactly that value of strain when the sensor is put in resonance with the lines engraved on the light spectrum by the molecules in the chemical species.

In this example, the detection system 125 is arranged to develop a differential signal based on the transmitted optical signal 121 and the reflected optical signal 123. The detection signal is then developed by the detection system 125 based on this differential signal. By utilising a differential signal, increased sensitivity is provided.

The detection signal may be an indication of the photonic transmission (or lack thereof) over a defined wavelength (or frequency) range. For example, the detection signal may be a display of the detected transmitted optical signal 121, the reflected optical signal 123 and/or a differential signal. It will be understood that the detection signal may be in any other suitable form to assist in indicating whether the chemical species is present in the sample or not.

Also, the detection signal may be a binary output indicating that either the chemical species is present in the sample, or the chemical species is not present in the sample. That is, the detection signal may be a “1” signal indicating that the chemical species is present and a “0” signal indicating that the chemical species is not present. Alternatively, the inverse of this logic could be used where the detection signal may be a “0” signal indicating that the chemical species is present and a “1” signal indicating that the chemical species is not present. The output may be based on a defined threshold being met by the output optical signal.

As the optical sensor is fabricated (as described below) to mimic a particular spectral signature, the light in each and the ratio of the flux between the transmitted optical signal 121 and the reflected optical signal 123 will vary strongly depending on whether that signature is either present or absent. That is, when a beam of light has undergone interaction with (or been emitted by) a particular chemical species, each will leave characteristic spectral lines imprinted at known wavelengths. Depending on the physical conditions, these lines may appear either in emission or absorption (the sensor described herein may operate in either setting). When multiple species are present, the resulting spectrum will be the superposition of a number of individual components, It will be understood that, as an alternative, only the transmitted optical signal 121 or only the reflected optical signal 123 could be received at the detection module. The detection module then uses that signal to develop a detection signal that indicates a positive or negative detection of the chemical species based on the analysis. In these alternatives, it will be understood that the sensitivity of the detection may be less than that when using the differential signal system and method described above.

In an alternative example, the sample optical signal 111 may be fed directly from the optical lens 113 into the optical sensor 105 via an optical fibre (not shown) without the use of an optical circulator or splitter. In this example, the output optical signal is the transmitted optical signal only. This transmitted optical signal would be fed into the equivalent of the first optical detection module 125. In this example, only an equivalent of the first optical detection module 127 is required.

Examples of how the fibre Bragg grating of the optical sensor 105 may be fabricated are now provided. The fibre Bragg grating that mimics the spectral response of the chemical species in the sample) may be fabricated in a number of different ways.

For example, an ultraviolet laser beam may be used to inscribe the required pattern into the core of a single-mode fibre to create the fibre Bragg grating. The action of strong UV light in producing small modifications in the refractive index of a glass substrate is exploited in other photonic technologies.

In a preferred approach, an aperiodic complex fibre Bragg grating may be fabricated.

For example, a single complex structure that may be optimised to accomplish complicated, multi-peaked transmission functions may be constructed as described by A. V. Buryak, K. Y. Kolossovski, and D. Y. Stepanov in "Optimization of refractive index sampling for multi-channel fibre Bragg gratings," IEEE J. Quantum Electron. 39, 91-98 (2003), or by Adenowo A. Gbadebo, Elena G. Turitsyna, and John A. R. Williams, in "Fabrication of precise aperiodic multichannel fibre Bragg grating filters for spectral line suppression in hydrogenated standard telecommunications fibre," Opt. Express 26, 1315-1323 (2018). Both of these papers are incorporated herein in their entirety.

The optical system used for writing these complex structures consists of an arrangement in which a fibre is exposed to the interference pattern generated by counter-propagating UV laser beams. By modulating the laser, a high degree of control of the index structure written within the glass core of the fibre can be obtained, allowing the inscription of complex functions in order to mimic the spectral response of the chemical species in the sample.

According to one example, a suitable apparatus used to implement an optical system used for writing these complex structures is described in US patent application published as US2010/0014809A1 titled "Optical structure writing system" and published on 21 Jan. 2010, which is incorporated herein in its entirety.

The optical sensor 105 is in the form of a single mode fibre having a fibre Bragg grating. The fibre Bragg grating has a refractive index (n) profile along the length (I) of the grating. The optical sensor is arranged to provide an output optical signal (that is either transmitted or reflected) that is associated with a positive detection of the chemical species in the sample. That is, the refractive index profile is associated with the sample optical frequency signature that is reflected from the sample.

The optical sensor is fabricated by fabricating the fibre Bragg grating that effectively creates a bespoke "photonic molecule". As the optical sensor is able to give a strong response at exactly the same optical frequencies as the desired chemical species, it is possible to perform a pattern matching operation before detecting the light. With this type of optical sensor, a single pixel device detection is provided.

The fibre Bragg gratings may be fabricated to be highly specific, so that they can target many spectral lines simultaneously. Also, they can operate at very high spectral dispersion so as to cleanly isolate and sense only the species desired.

Figure 2:
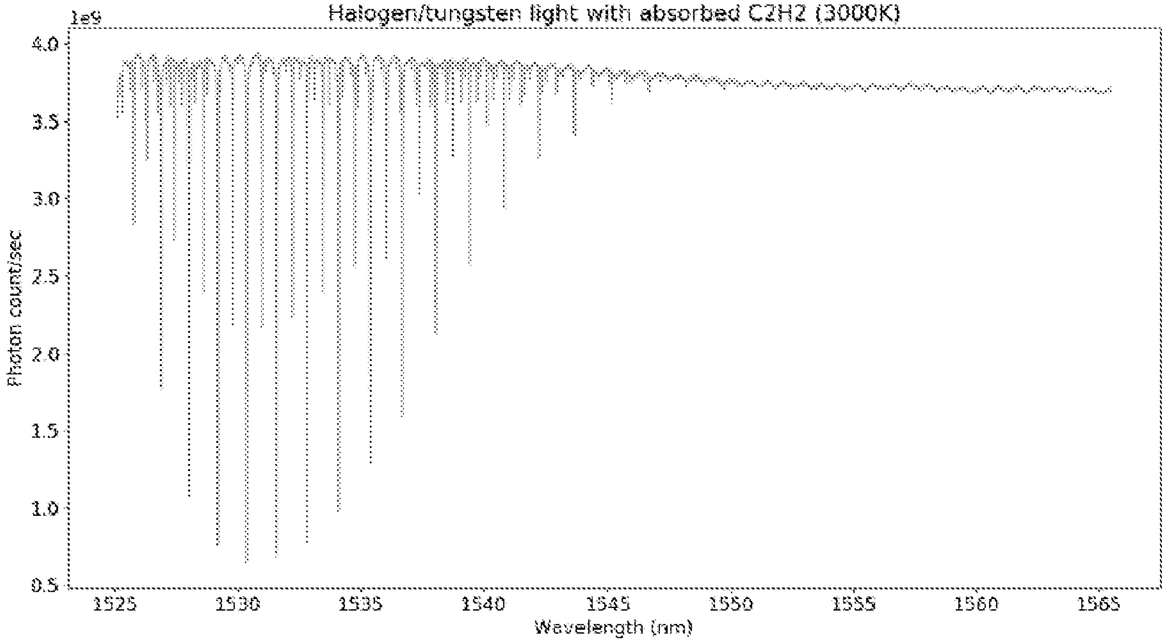
FIG. 2 shows an example of a spectral signature from molecular absorption according to the present disclosure.

FIG. 2 shows an example of a spectral signature from molecular absorption according to the present disclosure.

FIG. 2 shows the spectrum (wavelength in nm on the X-axis) arising from passing an input optical signal (equivalent to optical signal 109) from a Halogen/Tungsten filament through a gas cell (equivalent to the sample 103) containing C2H2 (Acetylene), which is equivalent to the chemical species mentioned in relation to FIG. 1. The resulting light (shown by the photon count per second on the Y-axis) can be seen to exhibit notable notches at specific wavelengths where photons from the input optical signal have been absorbed by the molecules of the chemical species along the light path. These absorption lines form the fingerprint which the herein described sensor system uses to identify the chemical species. The spectrum shown in FIG. 2 is the signal that would be received at the optical lens 113 in FIG. 1. Signals obtained in the field will result from an admixture of many chemical species, some with a strong spectral response in the infrared and some not.

Figure 3:
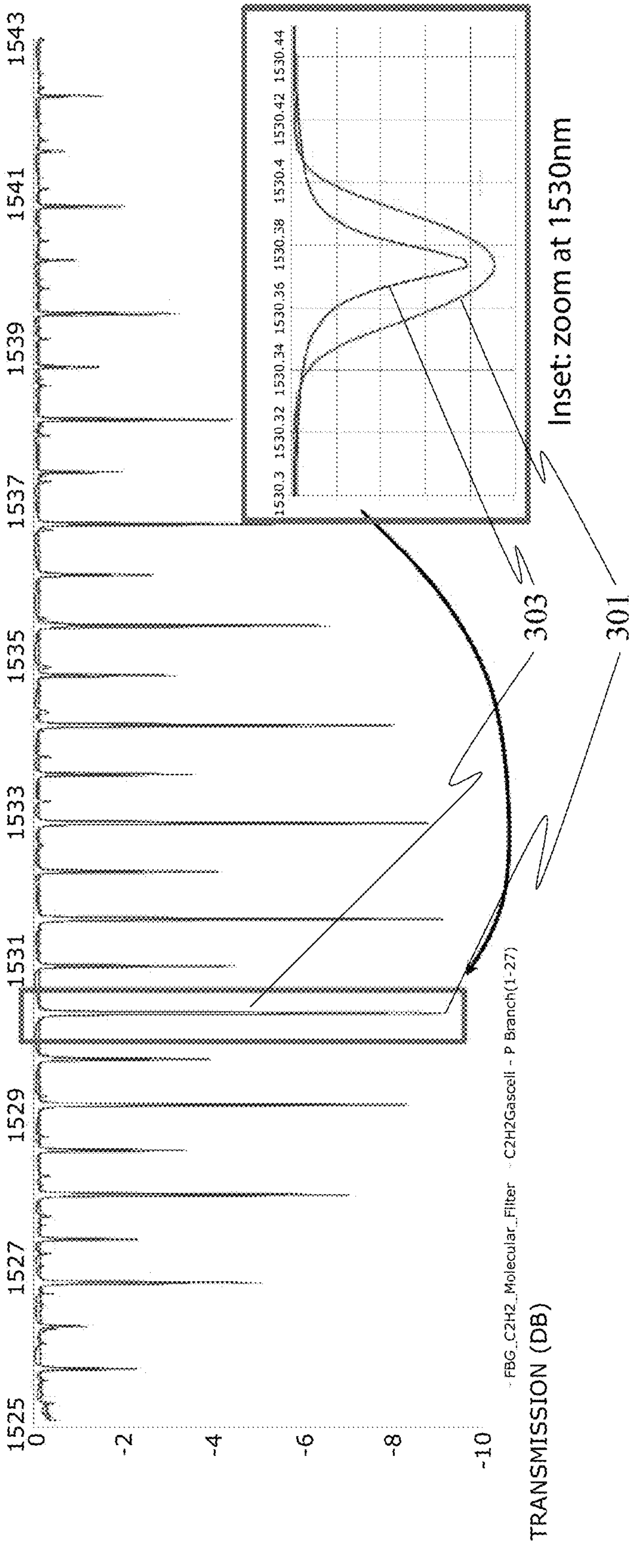
FIG. 3 shows an example spectrum of molecular absorption of acetylene and a measured response using a modulated aperiodic fibre Bragg grating according to the present disclosure.

FIG. 3 shows an example spectrum of molecular absorption of acetylene and a measured response using a modulated aperiodic fibre Bragg grating according to the present disclosure.

The first spectrum 301 is an experimental molecular absorption of C2H2 (Acetylene-plotted here over a narrower spectral range than that shown in FIG. 2). The second spectrum 303 is the experimentally measured response of the modulated fibre Bragg grating that is manufactured to specifically mimic the response of Acetylene. The inset in FIG. 3 shows a zoom of the data showing a single line. It can be seen from FIG. 3 that there is excellent reproduction of the complex spectral response of the Acetylene molecule being exhibited by the modulated fibre Bragg grating sensor.

FIGS. 4A-4C show an example of an optical sensor being used in a modulation mode and a spectral response wavelength shift according to an embodiment of the present disclosure;

FIG. 4A shows an unstrained fibre 401A with Bragg gratings 403. FIG. 4B shows the same fibre 401B strained with the Bragg gratings 403 moved in accordance with the change in length of the strained fibre 401. At the top of each of FIGS. 4A and 4B as well as in FIG. 4C a shift in the wavelength 405 of the spectral response 407 of the fibre Bragg grating is shown as the fibre (or sensor) is modulated between the strained and unstrained states. That is, FIG. 4A-4C illustrates the effect of applying strain to a fibre Bragg grating sensor. Each spectral feature generated by the Bragg grating will shift in wavelength when strain is applied. Therefore, by changing the strain (or temperature) it is possible to, for example, tune some given notch function generated by the sensor so as to sweep into, then out of alignment with a given spectral feature existing in the natural molecular spectrum of the target chemical species.

The modulation of the fibre with the Bragg grating (i.e. the optical sensor) may occur by heating and cooling the optical sensor. Alternatively, the modulation may occur by stretching and shrinking (or releasing) the fibre to change the length of the fibre. That is, a modulator is arranged to manipulate the fibre (with the Bragg gratings formed thereon), and thus the optical sensor, longitudinally. For example, the modulator may be a fibre stretcher that is attached to either end of the optical fibre in order to manipulate (e.g. stretch and release) the fibre longitudinally to increase and decrease the longitudinal strain on the fibre. As an alternative, the modulator may modulate the optical sensor using temperature to change the effective optical length of the fibre.

For example, a modulator may be arranged to stretch the optical fibre of the optical sensor to expand the length of the fibre by a defined distance. The modulator may also be arranged to enable the fibre to revert back to its original length. The expanding and reducing of the longitudinal length of the fibre (and thus the optical sensor including the Bragg grating) modulates the output optical signal. This modulation acts to shift the frequencies of all the features or optical filter notches produced by the grating. For example, in this fashion, the notches provided by the Bragg grating filter can be brought into and out of alignment with the spectral features imprinted by the sample. This in turn precipitates a change in intensity of the transmitted optical signal 121 and of the reflected optical signal 123, and/or a differential signal that is based on the transmitted optical signal 121 and the reflected optical signal 123.

Therefore, the output optical signal may be modulated using the fibre stretcher that modulates the output of the optical sensor. This particular arrangement may provide high sensitivity in a modest envelope.

According to one example, the fibre may be modulated using a saw tooth function in order to sweep through the resonance, and back thus causing a characteristic fluctuation in the light signal being measured.

Figure 5A:
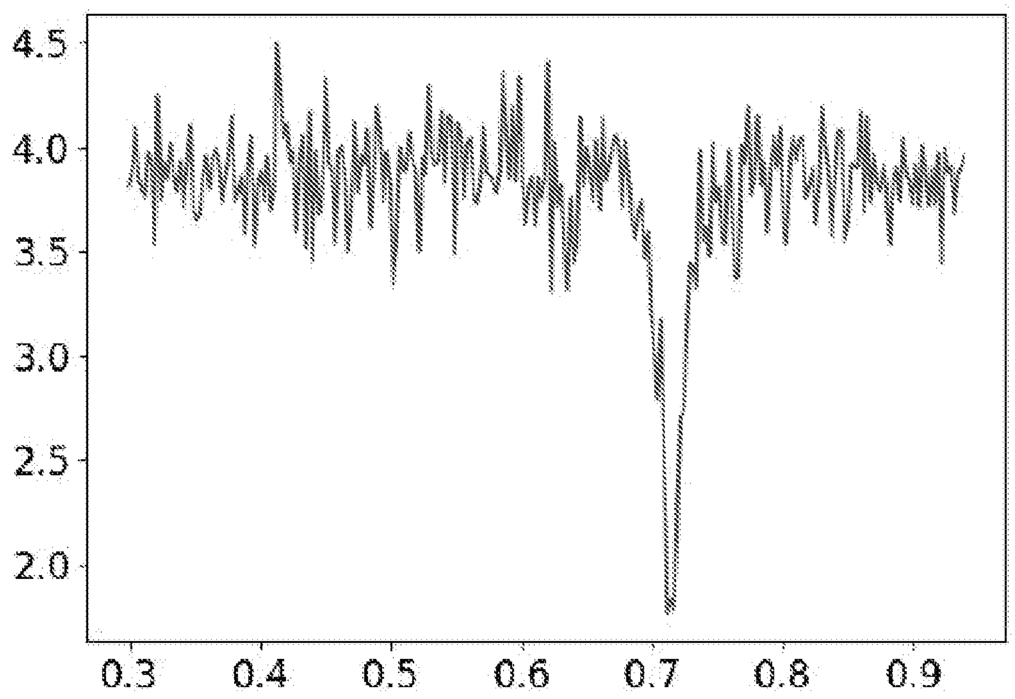
FIGS. 5A and 5B shows the spectrum of a modulated fibre Bragg grating response according to an embodiment of the present disclosure.
Figure 5B:
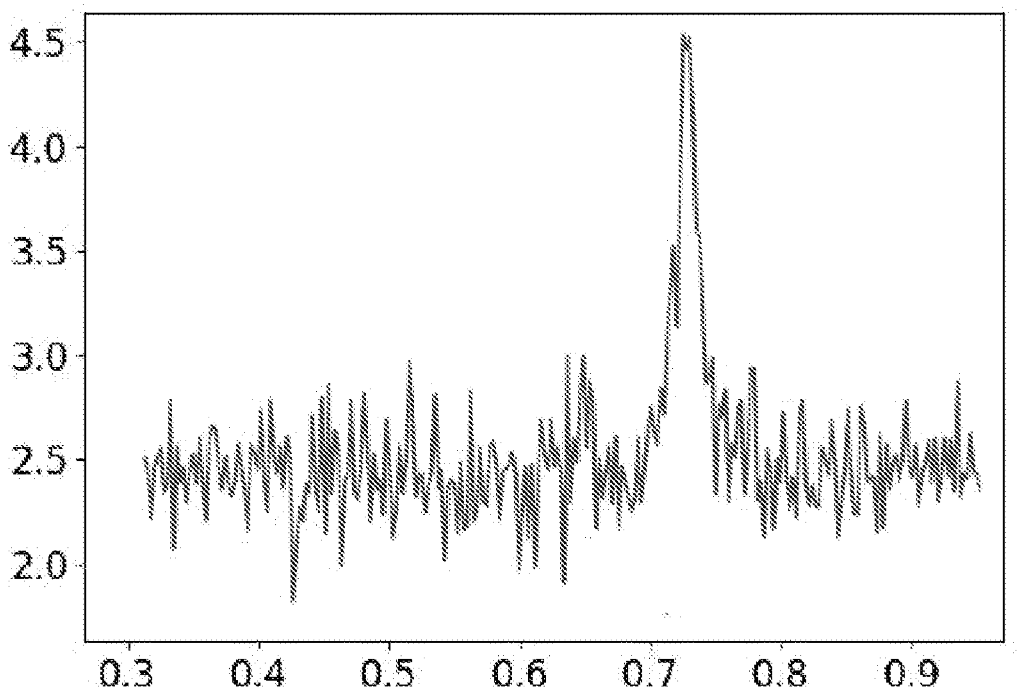

FIGS. 5A and 5B show the spectrum of a modulated fibre Bragg grating response according to an embodiment of the present disclosure.

FIG. 5A shows the reflected light spectrum of a fibre Bragg grating sensor when the sensor is modulated by strain. FIG. 5B shows the transmitted light spectrum of a fibre Bragg grating sensor when the sensor is modulated by strain. In each of FIGS. 5A and 5B the X-axis shows a value of strain (increasing with time) and the Y-axis shows the intensity of light measured by a photosensor.

The simulation shows the effect of recorded light intensity as a function of time (or strain) by placing the fibre Bragg grating sensor in a beam of light containing the target chemical species, e.g. Acetylene. The sum total of all reflected light and all transmitted light (at all wavelengths) is recorded while modulating the strain on the fibre of the sensor. When the strain reaches the exact point where the fibre Bragg grating sensor and the chemical species features are in exact alignment or resonance, there is a marked dip in the total reflected light emitted from the sensor as shown in FIG. 5A. In FIG. 5B, the other transmitted light channel where light passes through the fibre Bragg grating sensor exhibits a peak in transmission at exactly the same strain value as can be seen by the notch in the reflection signal of FIG. 5A. Either one, or both used in concert, of these signals can form the basis of a detection strategy: the presence of the target chemical species may be confirmed by the peak/notch in the detected light signal.

Figure 6:
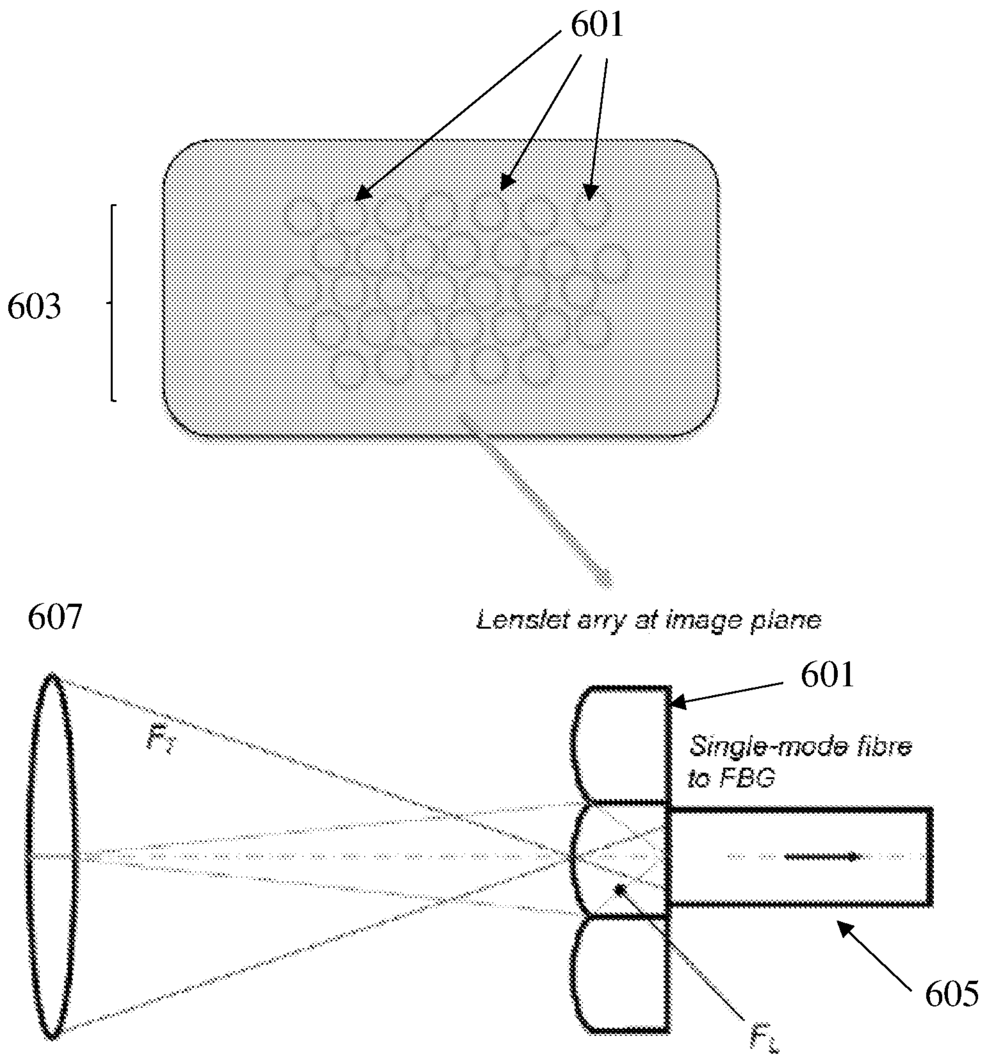
FIG. 6 shows an array of lenses feeding a set of modulated fibre Bragg gratings which each yields a separate sensor according to an embodiment of the present disclosure.

The sensor described above may detect the molecular fingerprint of a chemical species along a single sight-line (i.e. a single pixel in an image). FIG. 6 shows an array of lenses feeding a set of modulated fibre Bragg gratings which each yields a separate sensor according to an embodiment of the present disclosure. In this fashion, sensing may be conducted simultaneously over more than one sightline.

According to this example, multiple lenses 601, e.g. micro lenses, may be arranged in a pixel array 603 to provide multiple pixels that span a dispersed (spatial) spectrum. For example, the pixel array 603 may have x number of optical sensors arranged in columns and y number of optical sensors arranged in rows to form the pixel array 603.

Each of the micro lenses 601 is equivalent to the optical focusing lens 113 shown in FIG. 1. Each micro lens has a connected fibre Bragg grating sensor 605 that operates as described herein. Therefore, as a number of such sensors are provided, running in parallel, the sensor system may be exploited to deliver information on the presence of a chemical species over multiple sightlines. That is, an array of fibre Bragg grating sensors may be fed by the pixel array 603. Downstream of each fibre Bragg grating, the sensor functions as previously described, allowing many "pixels" to span a scene.

According to this particular example, a focusing mirror 607, such as a science relay mirror for example, is utilised to make sure that each of the micro lenses (hence each pixel being probed) sees a different part of the wider scene around the apparatus. According to one example, the focusing mirror may not be used and each of the micro lenses may be arranged in any suitable direction. For example, the micro lenses may be arranged so that they look in the same direction to probe a parallel sight line. According to another example, two or more of the micro lenses may be arranged so that they look in two or more different directions to probe two or more sight lines. According to another example, the micro lenses may be arranged to be at an image plane of any suitable camera system in order to probe a defined space.

Therefore, according to one example, light may pass through a cold gas sample leaving absorption lines that the herein described sensor system has been designed to recover. These absorption lines may pass through a matched optical sensor with a fibre Bragg grating that is modulated so that it is successively on- and off-resonance with the absorption lines. The reflected optical signal may dim strongly when on-resonance while the transmitted optical signal may be the opposite, and vice versa if working in opposite mode.

As the detection module scans the optical output(s) for on and off resonance, a strong optical signal can be detected by the detection module based on the transmitted optical signal and/or the reflected optical signal. This may be detected in one or other beam (reflected, transmitted), or for increased sensitivity, in the ratio of both. By applying a rapid modulation onto the fibre Bragg grating of the optical sensor, the signal indicating the presence of the desired chemical species will appear at a specific frequency and can be modulated so as to be separated from red noise.

Various embodiments and examples described herein provide one or more of the following advantages.

The optical sensor may be small and lightweight, while the photonic fibre technologies are environmentally robust and can be made to operate in environments where maintaining alignment of large optical systems is challenging. The optical sensor may deliver a similar intrinsic sensitivity to an orthodox high dispersion spectrograph but with a much smaller footprint and much reduced requirements for data recovery, downlink and processing. Furthermore, the optical sensor may be manufactured to probe many spectral lines simultaneously, thus retaining the ability to isolate and fingerprint individual signatures with high specificity, which is a feature that is often sacrificed when spectroscopic techniques are reformulated for miniaturised instruments to be used in the field.

The optical sensor may retain the advantages of a high dispersion spectrometer, as it effectively operates at very high dispersion, and spans a wide range of wavelength, but it does so within a modest envelope.

The optical sensor may directly recover only the information immediately required, such as to what extent the light received at the sensor carries the target spectral fingerprint. This therefore provides an advantage where size or downlink bandwidths are at a premium.

The optical device may find application in any setting where a beam of light carries information about a sample or remote environment. For example, the optical device may be used as a high sensitivity sensor aboard aircraft, unmanned aerial vehicles or satellites. The optical device may be used as a remote sensor spanning applications such as environmental monitoring for greenhouse gases, pollutants, land use, crop or ecosystem health, oceanography and minerals prospecting, for example, as well as in astrophysics.

INDUSTRIAL APPLICABILITY

The arrangements described are applicable to the optical sensing industries.

The foregoing describes only some embodiments of the present invention, and modifications and/or changes can be made thereto without departing from the scope and spirit of the invention, the embodiments being illustrative and not restrictive.

In the context of this specification, the word “comprising” means “including principally but not necessarily solely” or “having” or “including”, and not “consisting only of”. Variations of the word “comprising”, such as “comprise” and “comprises” have correspondingly varied meanings.

The invention claimed is:

1. An optical sensor for detecting a chemical species in a sample, the optical sensor comprising a single mode fibre having a fibre Bragg grating, wherein the fibre Bragg grating has a refractive index profile, the optical sensor arranged to provide an output optical signal based on a positive detection of the chemical species in the sample, wherein the sample, upon illumination, emits a sample optical signal having an optical frequency signature comprising a plurality of spectral lines that are associated with the chemical species, wherein the refractive index profile is associated with the optical frequency signature, and the fibre Bragg grating is arranged to be modulated to generate the output optical signal.

2. The optical sensor of claim 1, wherein the output optical signal is based on a transmitted optical signal that is generated by the fibre Bragg grating by the sample optical signal entering the fibre Bragg grating at a first end and exiting the fibre Bragg grating at a second end opposite to the first end.

3. The optical sensor of claim 1, wherein the output optical signal is based on a reflected optical signal that is generated by the fibre Bragg grating by the sample optical signal entering the fibre Bragg grating at a first end, being reflected, and then exiting the fibre Bragg grating at the first end.

4. The optical sensor of claim 1, wherein the optical signal is based on a differential signal generated from a transmitted optical signal and a reflected optical signal, wherein the transmitted optical signal and the reflected optical signal are generated by the fibre Bragg grating.

5. The optical sensor of claim 1 further comprising a modulator arranged to modulate the output optical signal generated by the fibre Bragg grating.

6. The optical sensor of claim 5, wherein the modulator is arranged to frequency shift the output optical signal by manipulating the fibre Bragg grating longitudinally.

7. The optical sensor of claim 5, wherein the modulator is arranged to frequency shift the output optical signal by adjusting the temperature of the fibre Bragg grating.

8. An optical sensor system comprising:

one or more optical sensors as claimed in claim 1, and a detection module arranged to:

analyse the output optical signal and develop a detection signal that indicates the positive detection of the chemical species based on the analysis.

9. The optical sensor system of claim 8, wherein the detection module is further arranged to:

develop a differential signal based on the output optical signal, wherein the output optical signal comprises a transmitted optical signal and a reflected optical signal generated by the one or more optical sensors, and develop the detection signal based on the differential signal.

10. The optical sensor system of claim 8 further comprising a modulator arranged to frequency shift the optical output signal by manipulating the fibre Bragg grating longitudinally.

11. The optical sensor system of claim 10 wherein the modulator is a fibre stretcher arranged to stretch the optical fibre to frequency shift the optical output signal.

12. The optical sensor system of claim 8 further comprising:

a plurality of the optical sensors as claimed in claim 1, and a plurality of micro lenses arranged in an array, wherein the micro lenses are aligned with the optical sensors for sensing over multiple sightlines.

* * * * *